United States Patent
Führer

(10) Patent No.: US 8,426,530 B2
(45) Date of Patent: Apr. 23, 2013

(54) METHOD AND DEVICE FOR PROVIDING A RAW MATERIAL FOR THE PRODUCTION OF PET CONTAINERS

(75) Inventor: Kaj Führer, Tegernheim (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 13/362,122

(22) Filed: Jan. 31, 2012

(65) Prior Publication Data

US 2012/0208908 A1 Aug. 16, 2012

(30) Foreign Application Priority Data

Feb. 15, 2011 (DE) .......................... 10 2011 004 151

(51) Int. Cl.
*C08G 63/00* (2006.01)
*C08G 59/00* (2006.01)

(52) U.S. Cl.
USPC ........................................................ 525/437

(58) Field of Classification Search .................... 521/48; 525/437
See application file for complete search history.

(56) References Cited

U.S. PATENT DOCUMENTS

| 7,989,558 B2 * | 8/2011 | Ofer ............................... 525/446 |
| 2009/0192235 A1 | 7/2009 | Friedlaender et al. |
| 2010/0152309 A1 * | 6/2010 | Booth et al. .................. 521/40.5 |
| 2010/0216902 A1 * | 8/2010 | Wendelin et al. ............... 521/47 |

FOREIGN PATENT DOCUMENTS

| DE | 102005013701 A1 | 9/2006 |
| JP | 2010208190 A | 9/2010 |
| WO | WO-2004106025 A1 | 12/2004 |
| WO | WO-2006099976 A1 | 9/2006 |

OTHER PUBLICATIONS

German Search Report for 10 2011 004 151.6, dated Oct. 19, 2011.

\* cited by examiner

*Primary Examiner* — Terressa Boykin

(74) *Attorney, Agent, or Firm* — Marshall, Gerstein & Borun LLP

(57) ABSTRACT

A method and a device for providing a raw material for the production of PET containers, the raw material being mixed from recycled PET (r-PET) and virgin PET (v-PET), where in order to optimize both the plant and the method, v-PET is added in a quantitatively controlled manner to the r-PET prior to the last heating of the r-PET or to the heated r-PET.

4 Claims, 1 Drawing Sheet

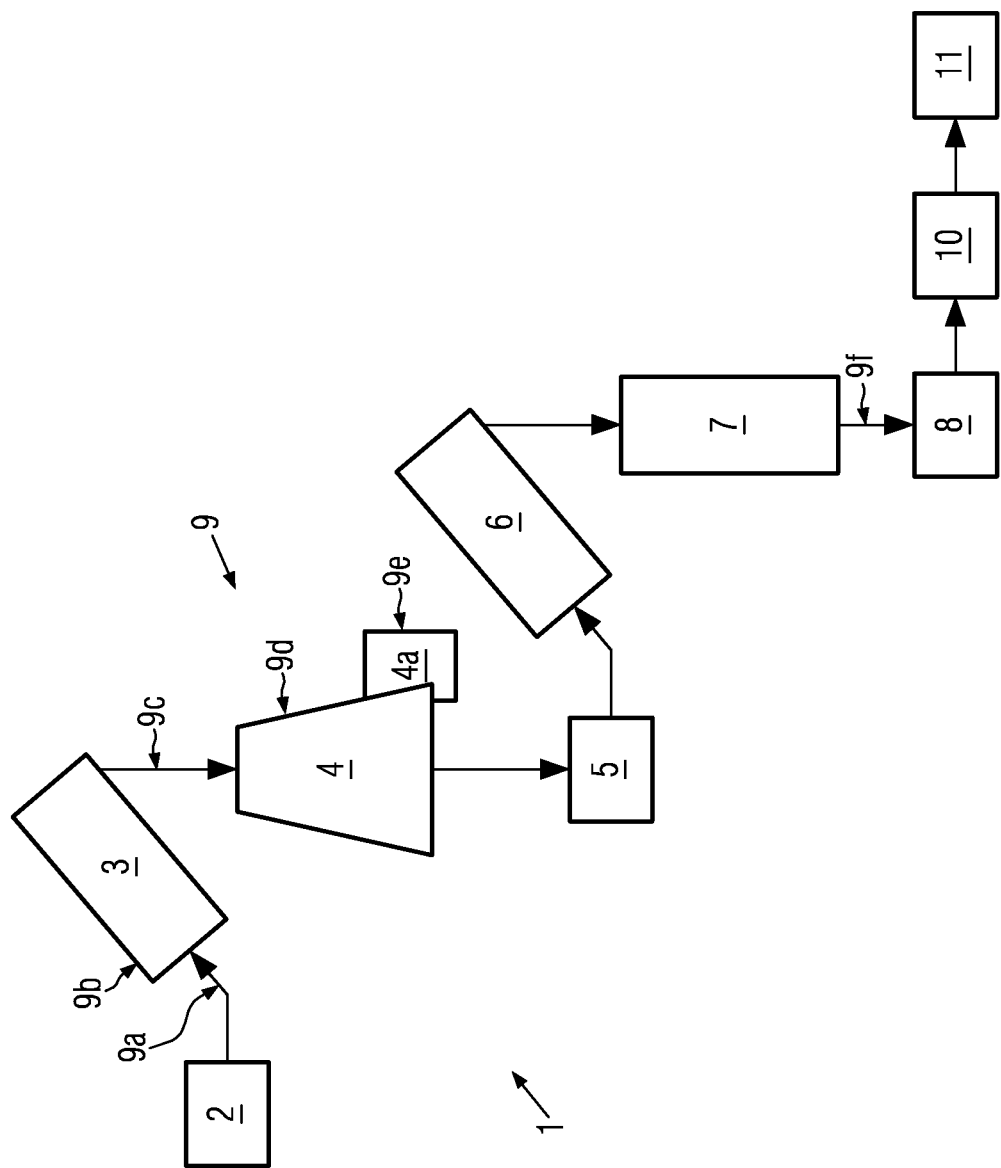

METHOD AND DEVICE FOR PROVIDING A RAW MATERIAL FOR THE PRODUCTION OF PET CONTAINERS

CROSS-REFERENCE TO RELATED APPLICATION

The present application claims the benefit of priority of German Application No. 102011004151.6, filed Feb. 15, 2011. The entire text of the priority application is incorporated herein by reference in its entirety.

FIELD OF THE DISCLOSURE

The disclosure relates to a method and a device for providing a raw material for the production of PET containers, the raw material being mixed from recycled PET and virgin PET.

BACKGROUND

It is known that part of the raw material used for the production of PET containers, especially of beverage bottles, is made of recycled PET (r-PET). To date, the r-PET was provided first, and was only then mixed with the v-PET. This was preferably done immediately before using the raw material, for example, immediately upstream of an injection molding machine for producing preforms. However, virgin PET needs drying prior to its use, since it inevitably absorbs moisture. To this end, a drying oven is required.

It is known, for example, from WO 2006/099976 that, on the other hand, the r-PET is cooled as it leaves the recycling process, before being introduced into the preform production process. Prior to the plasticization of the PET material, a mixing ratio which is optimal for the preform production process (e.g. 50:50) is provided for both materials, the cooled r-PET and the dried v-PET, which requires a lock or a mixing chamber.

SUMMARY OF THE DISCLOSURE

The disclosure includes as one aspect to provide a method and a device for providing a raw material for the production of PET containers, which save energy and are uncomplicated.

The embodiment according to the disclosure allows an optimization of the method and the device in many respects. Firstly, the drying oven can be waived, which also saves energy for the operation thereof. Secondly, the mixing can be accomplished directly in the production process of the r-PET, so that the lock/mixing chamber is dispensable and cooling the r-PET for the purpose of obtaining an optimum mixture is no longer necessary. Thus, it is possible to feed a downstream production machine for containers or their precursors directly from the recycling plant for PET.

An addition of the v-PET before heating the r-PET (for the first time) has the advantage that the v-PET is very well mixable in the following process without an additional mixing unit.

An addition directly into the heating device for the r-PET has the advantage that the v-PET can be easily added into the heating device in a quantitatively controlled manner and is well mixable in the following process without an additional mixing unit.

When added upstream of the reactor, the r-PET heats and dries the v-PET.

When added into the reactor, both the r-PET and the v-PET are heated, and the v-PET is dried.

Alternatively, the v-PET can also be heated, and thus dried, by the waste heat from the reactor in which the r-PET is treated.

When added downstream of the reactor, the r-PET is cooled by the v-PET which has a low temperature. At the same time the v-PET is dried.

BRIEF DESCRIPTION OF THE DRAWINGS

An embodiment of the disclosure will be explained in more detail below by means of the single drawing.

DETAILED DESCRIPTION OF THE PREFERRED EMBODIMENT

The FIGURE shows a recycling plant 1 for producing r-PET for raw material for the production of PET containers. The recycling plant 1 is of the type described in WO 2006/099976, but has been modified in accordance with the present disclosure. Accordingly, only the components of the recycling plant 1 important for the present disclosure will be described below. As to further details reference is made to the disclosure in WO 2006/099976.

Plant 1 includes a dosing device 2 into which particles, referred to as flakes below, are introduced, which were obtained in a grinder from objects of utility made of PET. The flakes were already washed before introducing them into the dosing device. The dosing device 2 conveys the flakes to a decontamination screw 3, loosening them and heating them preferably to about 150° C. The flakes then crystallize to such an extent that they are easily transportable and do not stick to each other.

After heating the flakes to the process temperature they are introduced into a decontamination reactor 4 in which, by the supply of gas, the contaminants expelled from the flakes are discharged and the flakes are stabilized at the temperature of 150° C. to which they were heated before.

From the decontamination reactor 4 the flakes are transported through another dosing device 5 into an SSP heating screw 6, and from this SSP heating screw 6 into an SSP reactor 7. In the SSP process molecule chain lengths are adapted to the requirements, which is accomplished at temperatures between 170° C. and 210° C. Moreover, a vacuum or an inert gas atmosphere can be applied.

From the SSP reactor the flakes are, again, supplied into a dosing device 8.

According to the disclosure the plant 1 comprises at least one dosing device 9 for adding v-PET in a quantitatively controlled manner directly into the recycling plant 1. Preferably, the v-PET is added in a manner easy to be controlled in respect of quantity, e.g. in the form of pellets or a granulate or the like.

The quantitatively controlled addition of v-PET can be effected at the most different positions. One of these positions is already at the beginning of the recycling process, before the introduction into the first heating screw 3. This position is designated with 9a. An advantage of this dosing position is that both PET materials have sufficient time afterwards to be mixed with each other homogeneously, without the necessity to provide a separate mixing unit. Also, the v-PET is subjected to the longest drying time at this dosing position.

Another dosing position 9b is directly into the decontamination screw 3, the advantages of which are the same as those of the dosing position 9a.

Another dosing position 9c is located between the decontamination screw 3 and the decontamination reactor 4.

Another dosing position 9d is provided in the reactor 4. Another dosing position 9e is located in a side region 4a of the decontamination reactor 4, where the v-PET introduced in a quantitatively controlled manner is preheated by the waste heat from the reactor 4 and is then added in a quantitatively controlled manner.

Finally, there is a last dosing possibility 9f downstream of the SSP reactor 7, from which the r-PET flakes are discharged at a high temperature, so that a heat exchange between both PET types is carried out and the cooling reactor provided in the prior art becomes redundant.

After exiting from the dosing device 8 the mixture of r-PET and v-PET can be introduced as raw material directly into a plasticization device 10, which prepares the raw material for being processed in a downstream production machine 11, for example, an injection molding machine for producing container preforms.

In a modification of the described and illustrated exemplary embodiment any one of the described dosing devices 9 may be employed as a single dosing device, or different dosing devices may be provided so as to consecutively add portions of the v-PET in a quantitatively controlled manner.

The invention claimed is:

1. A method for providing a raw material for the production of PET containers, comprising mixing the raw material from recycled PET (r-PET) and virgin PET (v-PET), and adding the v-PET to the r-PET one of prior to the last heating of the r-PET or to the heated r-PET, wherein the v-PET is added to the r-PET after said r-PET was heated in an SSP reactor.

2. The method according to claim 1, and adding the v-PET in a quantitatively controlled manner prior to heating the r-PET flakes.

3. The method according to claim 1, wherein the cold v-PET is added to the heated r-PET in a cooling section.

4. A device for providing a raw material for the production of PET containers, the raw material being mixed from recycled PET (r-PET) and virgin PET (v-PET), comprising a recycling plant provided with at least one dosing device for introducing v-PET in a quantitatively controlled manner one of prior to the last heating of the r-PET or into the heated r-PET, wherein the dosing device is provided downstream of an SSP reactor, in which heated r-PET exiting from the reactor is provided.

* * * * *